B. L. WORTHEN.
CAR WHEEL AND AXLE.
APPLICATION FILED JUNE 4, 1907.
945,894.
Patented Jan. 11, 1910.
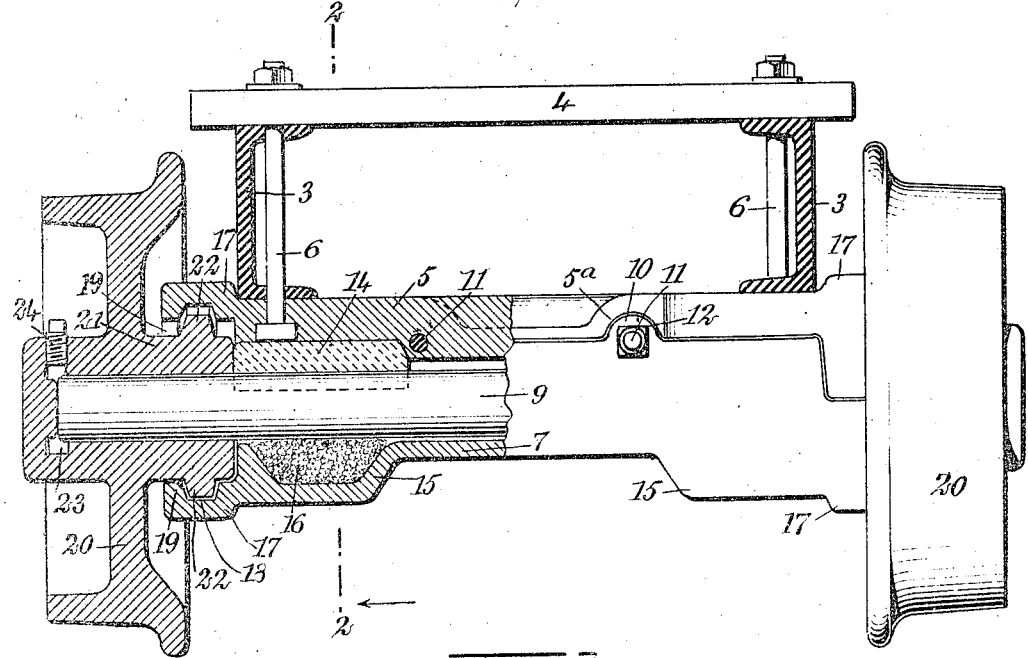
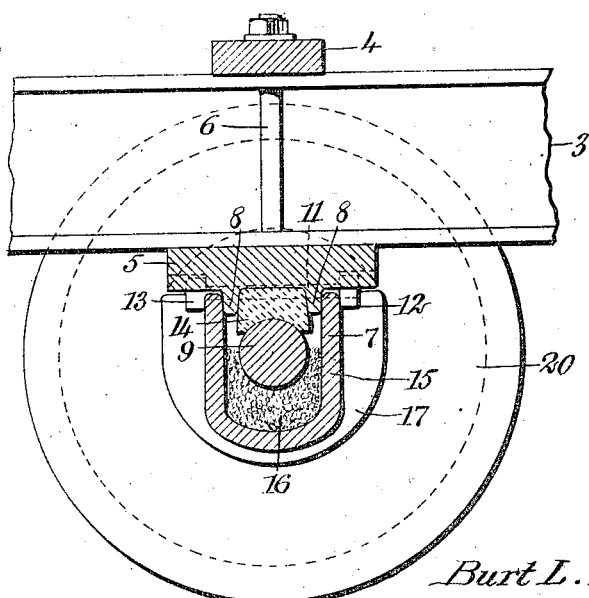
WITNESSES
H. Walker
W. Harrison
INVENTOR
Burt L. Worthen
BY
ATTORNEYS

UNITED STATES PATENT OFFICE.

BURT L. WORTHEN, OF TUCSON, ARIZONA TERRITORY, ASSIGNOR OF ONE-HALF TO THOMAS DONOHOE, OF AVELLA, PENNSYLVANIA.

CAR WHEEL AND AXLE.

945,894.  Specification of Letters Patent.  Patented Jan. 11, 1910.

Application filed June 4, 1907. Serial No. 377,173.

*To all whom it may concern:*

Be it known that I, BURT L. WORTHEN, a citizen of the United States, and a resident of Tucson, in the county of Pima and Territory of Arizona, have invented a new and Improved Car Wheel and Axle, of which the following is a full, clear, and exact description.

My invention relates to car wheels and axles, more particularly for use upon railway cars, and offering certain constructional advantages as hereinafter described and pointed out in the appended claims.

Reference is to be had to the accompanying drawings forming a part of this specification, in which similar characters of reference indicate corresponding parts in both the figures.

Figure 1 is a front elevation partly in section, showing my invention as applied to a railway car; and Fig. 2 is a section upon the line 2—2 of Fig. 1, looking in the direction of the arrow and showing the arrangement of the bearing box, the axle and the dope box and its contents.

Angle irons 3 are surmounted by a connecting cross-beam 4 and rest upon a plate 5, the cross-beam and plate being connected firmly together by the aid of bolts 6. A trough-like member 7 depends from the plate 5 and to facilitate this the plate 5 is provided with depending flanges 8. The axle is shown at 9. The trough-like member 7 is provided with perforated ears 10, which project into recesses 5ª in the plate 5, as will be understood from Fig. 1. Bolts 11 pass through the ears 10 of the trough-like member and the flanges 8 of the plate 5, and these bolts are provided with revoluble nuts 12 and with heads 13.

Resting upon the axle 9 are two bearings 14, one of which is shown in Figs. 1 and 2. The trough-like member 7 is provided with pockets 15, constituting dope boxes and filled with cotton-waste 16, or saturated with axle grease or other appropriate lubricant. The trough-like member 7 terminates in annular heads 17, provided internally with an annular recess 18 and further provided with a contracted throat 19. Service wheels are shown at 20, each being provided with a hub 21, the latter being loose upon the axle 9 and revoluble independently thereof. Each hub 21 is provided with an annular enlargement 22 fitting within the annular recess 18. This prevents undue movement of the wheels and axle in the general direction represented by the length of the axle. Each hub 21 is provided with an annular recess 23 closed by an oil plug 24. Owing to the fact that the flange 22 has but limited play within the recess 18, the motion of the wheels and axle is rendered true. The oil necessary for lubrication is poured into the annular recess 23 which is then closed by screwing in the plug 24, and saturates the waste 16.

As the axle 9 is loose relatively to the bearing 14 and the wheel hub 21 is loose relatively to the axle, the wear is distributed to better advantage and the friction is reduced to a minimum. The annular enlargement 22, by fitting neatly into the annular recess 18 retains the wheels to gage at all times. If, in consequence of breakage, any part should become detached from its normal position, no considerable damage is likely to ensue. A wheel 20 cannot leave its normal position even if the axle 9 should break in the middle or adjacent to the bearing. The bearing is dirt-proof and the entire design is of comparatively simple construction.

I do not limit myself to the exact arrangement of parts shown for the reason that changes may be made therein without departing from the spirit of my invention.

Having thus described my invention, I claim as new and desire to secure by Letters Patent:

1. The combination of a wheel having a side extension, a securing member fastened to the car and formed in sections for connecting with and disconnecting from the wheel extension, the securing member having interlocking parts which operate to confine the wheel without interfering with its rotation.

2. The combination of a wheel having a flanged extension, and a securing member fastened to the car having an internal depression for embracing and holding the flanged wheel extension, the securing member being formed in separable parts whereby it may be engaged with and disengaged from the wheel extension.

3. The combination of a wheel having an annular hub-like extension on its rear face, said extension having an encircling flange, and a two-part securing member fastened to the car body, each of the parts having an enlargement at one end formed with a semicircular cavity to embrace the flanged extension of the wheel, whereby when the parts are united the wheel extension is inclosed and the wheel held in place.

4. The combination of a wheel having a hub-like extension, said extension having an encircling flange, a securing member fastened to the car body and made in parts, each of said parts having an enlargement at one end formed with a cavity to embrace said flange, an axle extending into said wheel, and a bearing supporting said securing member and resting upon said axle.

5. The combination of a securing member, a bearing for supporting the same, an axle revoluble in relation to said bearing, a wheel mounted upon said axle and loose relatively to the same, and means for holding said wheel in predetermined working relation to said securing member.

In testimony whereof I have signed my name to this specification in the presence of two subscribing witnesses.

BURT L. WORTHEN.

Witnesses:
CHAS. F. SLACK,
D. C. GRIFFIN.